United States Patent [19]

Uchiyama

[11] 4,388,119
[45] Jun. 14, 1983

[54] DIBENZYLIDENE SORBITOL COMPOSITION AND PROCESS FOR PREPARATION THEREOF

[75] Inventor: Hiroshi Uchiyama, Hirakata, Japan

[73] Assignees: E. C. Chemical Ind. Co., Ltd.; C. Itoh & Co., Ltd., both of Osaka, Japan

[21] Appl. No.: 282,739

[22] Filed: Jul. 13, 1981

[30] Foreign Application Priority Data

Jul. 16, 1980 [JP] Japan ................... 55-96188

[51] Int. Cl.³ .............................................. C08K 5/15
[52] U.S. Cl. .................................. 106/316; 252/363.5; 524/108; 524/322
[58] Field of Search ..................... 252/363.5; 106/316; 524/322, 108

[56] References Cited

U.S. PATENT DOCUMENTS 3,639,312  2/1972  Turner ................................. 264/1.6
4,016,118  4/1977  Hamada ............................... 523/100

Primary Examiner—Allan Lieberman
Assistant Examiner—Patricia Short
Attorney, Agent, or Firm—Wenderoth, Lind & Ponack

[57] ABSTRACT

A composition consisting essentially of solid powdery dibenzylidene sorbitol and a higher fatty acid, the surface of the dibenzylidene sorbitol being coated with the higher fatty acid; and a process for producing dibenzylidene sorbitol powder having a coating of a higher fatty acid on its surface, which comprises a step of forming an aqueous emulsion of the higher fatty acid by adding an alkali to an organic solvent solution or hot molten mass of the higher fatty acid partially saponify the higher fatty acid and dispersing the resulting mixture of the higher fatty acid and its saponification product in water, a step of coating the surface of dibenzylidene sorbitol powder with the higher fatty acid by adding the dibenzylidene sorbitol to the resulting emulsion, and a step of separating the solid from the mixture, drying the solid and recovering the dried product. The transparency and rigidity of a polyolefin resin is improved by addition of aforesaid dibenzylidene sorbitol composition.

7 Claims, No Drawings

DIBENZYLIDENE SORBITOL COMPOSITION AND PROCESS FOR PREPARATION THEREOF

This invention relates to a dibenzylidene sorbitol composition, and more specifically, to a dibenzylidene sorbitol composition which is useful as an additive for improving the transparency and rigidity of polyolefin resin articles.

It is known that the addition of dibenzylidene sorbitol to polyolefin resins such as polyethylene and polypropylene improves the transparency of articles produced from these polyolefin resins (U.S. Pat. No. 4,016,118).

It has now been found in accordance with this invention that by coating a higher fatty acid on the surface of solid particles of conventional dibenzylidene sorbitol used as an additive for improving the transparency of polyolefin resins, its ability to improve transparency is markedly enhanced, and such coated dibenzylidene sorbitol also increases the rigidity of polyolefin resin articles.

According to this invention, there is provided a composition consisting essentially of solid powdery dibenzylidene sorbitol and a higher fatty acid, the surface of the solid powdery dibenzylidene sorbitol being coated with the higher fatty acid.

The higher fatty acid used in the composition of this invention is a saturated aliphatic monocarboxylic acid having 16 to 22 carbon atoms expressed by the general formula $CH_3(CH_2)_nCOOH$ in which n is an integer of from 14 to 20. Examples of preferred higher fatty acids are behenic acid, stearic acid and palmitic acid. Behenic acid is most preferred, and next comes stearic acid.

In the composition of this invention dibenzylidene sorbitol is used in the form of a solid powder. Its particle size is not strictly limited, and commercially available solid particles of dibenzylidene sorbitol which have a maximum particle size distribution of 100 to 200 mesh can be conveniently used as such.

The composition of this invention contains 95 to 50 parts by weight, preferably 80 to 50 parts by weight, of dibenzylidene sorbitol and 5 to 50 parts by weight, preferably 20 to 50 parts by weight, of the higher fatty acid, provided that the total amount of these components is 100 parts by weight.

The composition of the invention can be prepared by adding powdery dibenzylidene sorbitol in the above proportion to an aqueous emulsion of the higher fatty acid in the above proportion, stirring the mixture to cause adsorption of the higher fatty acid to the surface of the dibenzylidene sorbitol particles and thus form a coated layer of the higher fatty acid, separating the resulting higher fatty acid-coated dibenzylidene sorbitol from the emulsion, and washing and drying it.

The aqueous emulsion of the higher fatty acid used in the above procedure can be easily obtained by dispersing an organic solvent solution of the higher fatty acid in a concentration of 5 to 50% by weight, preferably 20 to 50% by weight, or a molten mass of the higher fatty acid, in water, preferably by using a small amount (e.g. 1 to 10 parts by weight, preferably 2 to 5 parts by weight, per 100 parts by weight of the higher fatty acid) of a surface-active agent. In preparing the aqueous emulsion from the molten mass of the higher fatty acid, hot water kept at a higher temperature than the melting point of the higher fatty acid is used. The surface-active agent can be prepared in situ by, for example, adding a small amount (e.g. 15 to 5 parts by weight, preferably 9 to 5 parts by weight, per 100 parts by weight of the higher fatty acid) of an alkali, for example, an alkali carbonate such as sodium carbonate, or an alkali hydroxide such as sodium hydroxide, or an organic amine, to an organic solvent solution or molten mass of the higher fatty acid before dispersing the solution or molten mass in water thereby to saponify a part of the fatty acid and thus form a mixture of the higher fatty acid and soap.

The presence of the higher fatty acid coating formed on the dibenzylidene sorbitol can be ascertained by dyeing the coated dibenzylidene sorbitol and observing it with a microscope.

When added to an olefin resin, dibenzylidene sorbitol coated with the higher fatty acid markedly improves the transparency of the resin, and the extent of this improvement is much larger than that attained by using dibenzylidene sorbitol which is not coated with the higher fatty acid. Additionally, the coating of the higher fatty acid improves the dispersibility of dibenzylidene sorbitol in polyolefins, and can serve to inhibit bleed-out of dibenzylidene sorbitol in polyolefin resins being processed, or in the resulting polyolefin articles.

Examples of olefinic resins whose improvement can be achieved as above by the coating of the higher fatty acid include polymers and copolymers of aliphatic monoolefins having 2 to 6 carbon atoms which have a number average molecular weight of about 10,000 to 200,000, preferably about 30,000 to about 150,000, such as polyethylene, polypropylene and a crystalline ethylenepropylene copolymer.

The dibenzylidene sorbitol coated with the higher fatty acid is used in an amount of 0.05 to 0.7 part by weight, preferably 0.1 to 0.5 part by weight, per 100 parts by weight of the polyolefin resin and can substantially increase the transparency of the polyolefin resin when used in these amounts.

The dibenzylidene sorbitol coated with the higher fatty acid is also superior to the uncoated product in that the former increases the rigidity of polyolefin resin articles.

The composition of this invention may be used as a master batch of a polyolefin resin containing it in a high concentration.

The composition of this invention can be incorporated into a polyolefin resin by any known mixing means.

It is important that in the composition of this invention the surfaces of dibenzylidene sorbitol particles are coated with the higher fatty acid. When a polyolefin resin is simply used in combination with dibenzylidene sorbitol and the higher fatty acid, the aforesaid improved transparency cannot be obtained and the effect of inhibiting bleed-out is small.

A polyolefin resin having the composition of this invention incorporated therein is suitable as packing materials or containers for cosmetics and foodstuffs.

The following Examples further illustrate the present invention.

All parts and percentages in these examples are by weight unless otherwise specified.

The transparency (haze value) and rigidity in these examples were tested by the following methods.

(1) Haze Value
   Measured by the method of ASTM D1001-59T.
(2) Rigidity
   Determined by measuring 100% modulus.

Examples 1 to 3 show the production of the composition of this invention, whereas Examples 4 to 6 show the incorporation of the composition in polyolefin resins.

EXAMPLE 1

(1) Fifty parts of behenic acid and 150 parts of methanol were fed into a glass-lined vessel and heated to 60° C., and the mixture was stirred at this temperature to form a solution. A solution of 4 parts of potassium carbonate in 15 parts of water was gradually added to the solution, and the mixture was stirred for 1 to 2 minutes at the above temperature. Then, 150 parts of water was added, and the mixture was further stirred to prepare an emulsion having behenic acid dispersed therein.

Fifty parts of dibenzylidene sorbitol was added to the resulting emulsion, and after stopping the heating, the mixture was stirred to give a white viscous emulsion. Hydrochloric acid was added to adjust the pH of the emulsion to 7. The solid was separated by filtration, washed with water, and dried to give 100 parts of a white powder.

(2) Five grams of the resulting product was put in a 100 cc glass beaker, and 20 g of a 0.1% aqueous solution of Gentiana Violet, a dye for coloring the higher fatty acid for microscopic examination was added. The mixture was stirred, whereupon the powder was dyed immediately to give a violet viscous solution. The solution was filtered and dried to give a powder having a violet-colored surface.

When a small amount of the resulting violet powder was put on a filter paper and washed with warm ethanol, the surface coating dissolved and a white dibenzylidene sorbitol powder appeared.

On the other hand, when the starting dibenzylidene sorbitol before addition of the higher fatty acid emulsion as used in (1) above was treated with the same dye as above, it was not colored at all.

The results of the above test show that the white powder obtained in (1) above consists of a core of dibenzylidene sorbitol particles and the behenic acid completely covering the surfaces of these particles.

EXAMPLE 2

Twenty parts of stearic acid and 60 parts of methanol were put in a glass-lined vessel, and heated to 60° C., and the mixture was stirred at this temperature for 30 to 40 minutes to dissolve the stearic acid completely. A solution of 3.2 parts of sodium carbonate in 8 parts of water was gradually added, and the mixture was stirred for 1 to 2 minutes at the above temperature. Then, 150 parts of water was added, and the mixture was stirred to disperse the stearic acid well and thus form an emulsion.

Eighty parts of the same dibenzylidene sorbitol powder as in Example 1 was added to the resulting emulsion, and after stopping the heating, the mixture was stirred to give a white viscous emulsion. The emulsion was neutralized with a small amount of dilute hydrochloric acid to a pH of 7. The solid was separated by filtration, washed with water and dried to give 100 parts of a white powder.

The product was tested in the same way as in Example 1. It was found that a coated layer of stearic acid was formed on the entire surface of the dibenzylidene sorbitol particles.

EXAMPLE 3

Thirty parts of palmitic acid (m.p. 62.6° C.) was put in a glass-lined vessel, and heated to 65° C. to dissolve it. A solution at 65° C. of 4.8 parts of potassium carbonate in 10 parts of water was added gradually with stirring, and the stirring was continued for about 10 minutes. Then, 150 parts of hot water at 65° C. was gradually added to form an emulsion. The heating was then stopped, and 70 parts of the same dibenzylidene sorbitol as in Example 1 was added. The mixture was stirred to give a viscous emulsion. The emulsion was worked up in the same way as in Example 1 to give 100 parts of a white powder.

The white powder was tested in the same way as in Example 1. It was found that the surface of the dibenzylidene sorbitol particles was completely coated with palmitic acid.

EXAMPLE 4

A predetermined amount of the composition prepared in Example 1 was added to pellets of polypropylene (Shoaromer EA110, a tradename for a product of Showa Denko Kabushiki Kaisha) having a number average molecular weight of 35,000, and they were mixed by a blender. The resulting resin composition was injection-molded at an injecting temperature of 230° C. to form a plate-like test specimen having a thickness of 1 mm.

The state and haze value of the test specimen were determined, and the results are shown in Table 1.

For comparison, test specimens were prepared in the same way as above except that dibenzylidene sorbitol and behenic acid were used singly, or polypropylene alone was used. The specimens were tested in the same way as above, and the results are also shown in Table 1.

TABLE 1

| Specimen No. | Additive Type | Amount (parts per 100 parts of the resin) | Amount of DBS (parts per 100 parts of the resin) | Transparency (haze value) | State of the plate-like specimen as molded |
|---|---|---|---|---|---|
| 1 | Not added | — | — | 40 | Non-transparent and white |
| 2 | Dibenzylidene sorbitol | 0.3 | 0.3 | 19 | Transparent |
| 3 | Dibenzylidene sorbitol | 0.15 | 0.15 | 37 | Non-transparent |
| 4 | Behenic acid | 0.15 | — | 40 | Non-transparent and white |
| 5 | Composition | 0.3 | 0.15 | 18 | Transparent |

TABLE 1-continued

| Specimen No. | Type | Additive Amount (parts per 100 parts of the resin) | Amount of DBS (parts per 100 parts of the resin) | Transparency (haze value) | State of the plate-like specimen as molded |
|---|---|---|---|---|---|
| | of Example 1 (DBS:behenic acid = 1:1) | | | | |

(*): DBS = dibenzylidene sorbitol

The results given in Table 1 show that the specimen No. 5 containing the composition of this invention exhibited a slightly higher degree of transparency than the specimen No. 2 which contains twice as much dibenzylidene sorbitol as in the specimen No. 5; that the specimen No. 3 containing dibenzylidene sorbitol alone in the same amount as in the specimen No. 5 hardly improved the transparency of polypropylene; and that the specimen No. 4 containing benehic acid alone was equivalent to the specimen No. 1 containing no additive. Hence, these results substantiate the unexpected effect of the present invention brought about by the coating of the higher fatty acid.

EXAMPLE 5

Each of the compositions obtained in Examples 1 to 3 was added in the amounts shown in Table 2 to the same polypropylene as used in Example 4, and they were mixed by a blender. The resulting resin composition was extruded at an extruding temperature of 240° C. by a T-die extruder to form a film-like specimen having a thickness of 0.2 mm. The transparency, rigidity and state of the specimen and soiling of a cooling roll by bleed-out during molding were tested, and the results are shown in Table 2. For comparison, a film specimen containing dibenzylidene sorbitol alone and a film of polypropylene containing no additive were tested in the same way, and the results are shown in Table 2.

TABLE 2

| Specimen No. | Type | Additive Amount (parts per 100 parts of the resin) | Amount of DBS (parts per 100 parts of the resin) | Transparency (haze value) | Rigidity (kg/cm$^2$) | Bleeding | State of the film specimen |
|---|---|---|---|---|---|---|---|
| 6 | Not added | — | — | 44 | 11200 | None | Non-transparent and white |
| 7 | Dibenzylidene sorbitol | 0.3 | 0.3 | 20 | 13600 | In 10 minutes, the cooling roll was whitened. | Transparent and slightly bluish |
| 8 | Composition of Example 1 (DBS: behenic acid = 1:1) | 0.3 | 0.15 | 19 | 14000 | None | Transparent and slightly bluish |
| 9 | Composition of Example 2 (DBS:stearic acid = 4:1) | 0.3 | 0.24 | 20 | 14000 | In 130 minutes, slight bleeding occurred. | Transparent and slightly yellowish |
| 10 | Composition of Example 3 (DBS:palmitic acid = 7:3) | 0.3 | 0.21 | 21 | 13600 | In 200 minutes, slight bleeding occurred. | Transparent and slightly yellowish |

(*) DBS = dibenzylidene sorbitol

The results given in Table 2 demonstrate that the specimens Nos. 8, 9 and 10 containing the compositions of this invention showed a greater extent of improvement of transparency and rigidity than the specimen No. 7 containing dibenzylidene sorbitol alone, and developed little or no bleeding.

EXAMPLE 6

A predetermined amount of the composition prepared in Example 1 was added to pellets of low-density polyethylene(Sumikathene G801, a tradename for a product of Sumitomo Chemical Co., Ltd.) for injection, having a molecular weight of 40,000, and they were mixed by a blender. The resulting resin composition was injection-molded at an injecting temperature of 210° C. to prepare a plate-like test specimen having a thickness of 1 mm.

For comparison, the above procedure was repeated except that no additive was used, or dibenzylidene sorbitol and behenic acid were used singly.

The states and haze values of the test specimens were determined, and the results are shown in Table 3.

TABLE 3

| Sample No. | Additive Type | Amount (parts per 100 parts of the resin) | Amount of DBS (parts per 100 parts of the resin) | Transparency (haze value) | State of the plate-like specimen as molded |
| --- | --- | --- | --- | --- | --- |
| 11 | Not added | — | — | 35 | Semitransparent and opalescent |
| 12 | Dibenzylidene sorbitol | 0.3 | 0.3 | 21 | Transparent |
| 13 | Dibenzylidene sorbitol | 0.15 | 0.15 | 31 | Transparent and opalescent |
| 14 | Behenic acid | 0.15 | — | 35 | Semitransparent and opalescent |
| 15 | Composition of Example 1 (DBS:behenic acid = 1:1) | 0.3 | 0.15 | 19 | Transparent |

(*): DBS = dibenzylidene sorbitol

What we claim is:

1. A composition consisting essentially of 95 to 50 parts by weight of solid powdery dibenzylidene sorbitol and 5 to 50 parts by weight of at least one higher fatty acid of the formula $CH_3(CH_2)_nCOOH$ in which n is an integer of from 14 to 20, the total weight of said two components being 100 parts by weight, the surface of the dibenzylidene sorbitol being coated with the higher fatty acid.

2. The composition of claim 1 wherein the higher fatty acid is behenic acid, stearic acid or palmitic acid.

3. The composition of claim 1 wherein the maximum particle size distribution of the dibenzylidene sorbitol powder is 100 to 200 mesh.

4. A process for producing dibenzylidene sorbitol powder having a coating of a higher fatty acid on its surface, which comprises:
   a step of forming an aqueous emulsion of at least one higher fatty acid of the formula $CH_3(CH_2)_nCOOH$, in which n is an integer of from 14 to 20, by adding an alkali or an organic amine to an organic solvent solution or hot molten mass of the higher fatty acid to partially saponify the higher fatty acid, and dispersing the resulting mixture of the higher fatty acid and its saponification product in water,
   a step of coating the surface of 95 to 50 parts by weight of dibenzylidene sorbitol powder with 5 to 50 parts by weight of the higher fatty acid by adding the dibenzylidene sorbitol powder to the resulting aqueous emulsion, the total weight of the dibenzylidene sorbitol powder and the higher fatty acid being 100 parts by weight, and
   a step of separating the resultant solid from the mixture, drying the solid and recovering the dried product.

5. The process of claim 4 wherein the concentration of the higher fatty acid in the organic solvent solution is 5 to 50% by weight.

6. The process of claim 4 wherein the alkali or organic amine is used in an amount of 5 to 15 parts by weight per 100 parts by weight of the higher fatty acid.

7. An additive for improving the transparency of a polyolefin resin, said additive comprising (A) a dibenzylidene sorbitol composition consisting essentially of 95 to 50 parts by weight of solid powdery dibenzylidene sorbitol and 5 to 50 parts by weight of at least one higher fatty acid of the formula $CH_3(CH_2)_nCOOH$ in which n is an integer of from 14 to 20, the total weight of said two components being 100 parts by weight, the surface of the dibenzylidene sorbitol being coated with the higher fatty acid, and (B) a conventional additive for a polyolefin resin.

* * * * *